United States Patent
Yu

(10) Patent No.: US 12,062,471 B2
(45) Date of Patent: Aug. 13, 2024

(54) ELECTROMAGNETIC INDUCTION POTENTIOMETER ADAPTIVE FOR FULL-STROKE DETECTION

(71) Applicant: SHENZHEN GULI TECHNOLOGY CO., LTD., Shenzhen (CN)

(72) Inventor: Hongyong Yu, Shenzhen (CN)

(73) Assignee: SHENZHEN GULI TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 18/540,902

(22) Filed: Dec. 15, 2023

(65) Prior Publication Data

US 2024/0112837 A1 Apr. 4, 2024

Related U.S. Application Data

(63) Continuation of application No. PCT/CN2021/102366, filed on Jun. 25, 2021.

(30) Foreign Application Priority Data

Jun. 18, 2021 (CN) .......................... 202110678873.8

(51) Int. Cl.
*H01C 10/10* (2006.01)
*A63F 13/218* (2014.01)
(Continued)

(52) U.S. Cl.
CPC ......... *H01C 10/103* (2013.01); *A63F 13/218* (2014.09); *A63F 13/22* (2014.09);
(Continued)

(58) Field of Classification Search
CPC ................. H01C 10/103; G05G 9/047; G05G 2009/04748; G05G 2009/04755; H01H 25/04
See application file for complete search history.

(56) References Cited

U.S. PATENT DOCUMENTS 10,001,530 B2 * 6/2018 Bottinelli ............... G01R 33/09
10,554,875 B2 * 2/2020 Lee .......................... G03B 5/00
(Continued)

FOREIGN PATENT DOCUMENTS

CN          1277656 A     12/2000
CN        101960714 A      1/2011
(Continued)

OTHER PUBLICATIONS

International Search Report issued in corresponding International application No. PCT/CN2021/102366, mailed Mar. 17, 2022.
(Continued)

*Primary Examiner* — Kyung S Lee

(57) ABSTRACT

Provided is an electromagnetic induction potentiometer adaptive for full-stroke detection, including a movable element configured to obtain an input for position change, a permanent magnet attached to the movable element, a magnetic induction sensor configured to sense positions of the permanent magnet and generate an initial potential signal, and an full-stroke adaptive output adjusting unit configured to collect the initial potential signal and adaptively adjust the initial potential signal to an actual potential signal corresponding to a full stroke of position changing of the movable element.

9 Claims, 5 Drawing Sheets

(51) Int. Cl.
*A63F 13/22* (2014.01)
*G05G 9/047* (2006.01)
(52) U.S. Cl.
CPC ... *G05G 9/047* (2013.01); *G05G 2009/04748* (2013.01); *G05G 2009/04755* (2013.01)

(56) References Cited

U.S. PATENT DOCUMENTS

| | | | |
|---|---|---|---|
| 2008/0164970 | A1 | 7/2008 | Malzahn |
| 2024/0053177 | A1* | 2/2024 | Yu .......................... G01D 21/00 |
| 2024/0112837 | A1* | 4/2024 | Yu .......................... A63F 13/218 |

FOREIGN PATENT DOCUMENTS

| | | |
|---|---|---|
| CN | 102496433 A | 6/2012 |
| CN | 107086100 A | 8/2017 |
| CN | 207781312 U | 8/2018 |
| CN | 110989615 A | 4/2020 |
| CN | 111532252 A | 8/2020 |
| FR | 1447100 A | 7/1966 |
| JP | 2016136837 A | 7/2016 |

OTHER PUBLICATIONS

Written Opinion of the International Search Authority in corresponding International application No. PCT/CN2021/102366, mailed Mar. 17, 2022.
CNIPA, First Office Action issued for Chinese Application No. 202110678873.8, mailed Aug. 3, 2022 (10 pages).
Notification to Grant Patent Right for Invention, Chinese Application No. 202110678873.8, mailed Feb. 27, 2023 (3 pages).

* cited by examiner

ELECTROMAGNETIC INDUCTION POTENTIOMETER ADAPTIVE FOR FULL-STROKE DETECTION

TECHNICAL FIELD

The present disclosure relates to the technical field of electronic technologies, and in particular to an electromagnetic induction potentiometer adaptive for full-stroke detection.

BACKGROUND

A potentiometer is one type of variable resistors, which is generally composed of a resistor and a rotatable system or a slidable system to generate part of voltage output through movements of a movable contact on the resistor. Carbon films or resistance wire structures are mostly applied in conventional potentiometers to detect position of the potentiometers, which requires contacting and rubbing against the carbon films of the movable contact. Shortcomings of the contacting type structure of the conventional potentiometers include short wear life and great production error of the carbon films and interference clutter due to contacting which is generated by position changes due to the friction at contacting portions, leading to sizzling interference sound during volume adjustment when being used in speakers, etc.

The electromagnetic induction potentiometers overcome the above shortcomings with permanent magnets as rotatable or slidable components and linear hall-sensors for detecting the position of the permanent magnets in real time. There is no contacting, wear, or interference clutter during position adjustment of the electromagnetic induction potentiometers. CN applications No. 201320158412.9 and 201721701957.4 both disclose electromagnetic induction potentiometers.

However, there exists problem of inconsistent output ranges of electromagnetic induction potentiometers due to poor magnetic consistencies of permanent magnets when being applied in the electromagnetic induction potentiometers. It takes time and raises costs in labor and equipment to calibrate the electromagnetic induction potentiometers one-by-one, which is inconvenient for mass production. A current solution to this problem is to detect output values of the hall-sensors within a fixed range which is relatively narrow and safe. As shown in FIG. 1, output ranges of hall-sensors differ from one to one for same strokes of potentiometers. A relatively conservative detection range is applied in detections to define the output ranges of the potentiometers according to output characteristics, for positions in the stroke but out of detection ranges, a maximum value or a minimum value is output directly. It brings a new problem that the output ranges of the potentiometers can only cover part of the stroke of the potentiometers. When the output of the sensors is out of the detection range, it is difficult to effectively detect the corresponding position in the stroke, full-stroke detection cannot be achieved, which affects user experience.

Therefore, it becomes an urgent technical problem to be solved to reduce inconsistencies in the output ranges due to the magnetic inconsistencies of the permanent magnets in the electromagnetic induction potentiometers to fulfill full-stroke detections of the electromagnetic induction potentiometers.

SUMMARY

An electromagnetic induction potentiometer adaptive for full-stroke detection is proposed to solve the above-mentioned problem, which includes a movable element configured to obtain an input for position change, a permanent magnet attached to the movable element, a magnetic induction sensor configured to sense positions of the permanent magnet and generate an initial potential signal, and a full-stroke adaptive output adjusting unit configured to collect the initial potential signal and adaptively adjust the initial potential signal to an actual potential signal corresponding to a full stroke of position change of the movable element.

Optionally, the full-stroke adaptive output adjusting unit includes an information collecting module configured to collect the initial potential signal and obtain the initial potential sampling value, a signal output module configured to output the actual potential signal, and a control module configured to perform following steps:

B1: obtaining a preset potential sampling range, taking a minimum value of the preset potential sampling range as a minimum value of an actual potential sampling range, and a maximum value of the preset potential sampling range as a maximum value of the actual potential sampling range;

B2: controlling the information collecting module to sample output of the magnetic induction sensor and obtaining the initial potential sampling value;

B3: obtaining an actual potential output value according to a comparison result between the initial potential sampling value and the actual potential sampling range, and controlling the signal output module to output the actual potential signal;

B4: adjusting the actual potential sampling range according to the comparison result between the initial potential sampling value and the actual potential sampling range; and B5: returning to the step B2.

Optionally, the step B3 is defined as comparing the initial potential sampling value with the maximum value and the minimum value of the actual potential sampling range, taking the initial potential sampling value as an actual potential sampling value in response to that the initial potential sampling value is in the actual potential sampling range; taking the minimum value of the actual potential sampling range as the actual potential sampling value in response to that the initial potential sampling value is less than the minimum value of the actual potential sampling range; taking the maximum value of the actual potential sampling range as the actual potential sampling value in response to that the initial potential sampling value is greater than the maximum value of the actual potential sampling range; and defining the actual potential output value basing on the actual potential sampling value, the actual potential sampling range, and an actual potential output range, and controlling the signal output module to output the actual potential signal according to the actual potential output value.

Optionally, a difference between the maximum value of the actual potential sampling range and the minimum value of the actual potential sampling range is taken as an amplitude of the actual potential sampling range, a difference between a maximum value of the actual potential output range and a minimum value of the actual potential output range is taken as an amplitude of the actual potential output range, and a ratio of the actual potential sampling value to the amplitude of the actual potential sampling range is equal to the a ratio of the actual potential output value to the amplitude of the actual potential output range.

Optionally, the step B4 is defined as comparing the initial potential sampling value with the maximum value and the minimum value of the actual potential sampling range, omitting adjustment to the actual potential sampling range in response to that the initial potential sampling value is in the actual potential sampling range; updating the minimum value of the actual potential sampling range with the initial potential sampling value in response to that the initial potential sampling value is less than the minimum value of the actual potential sampling range; and updating the maximum value of the actual potential sampling range with the initial potential sampling value in response to that the initial potential sampling value is greater than the maximum value of the actual potential sampling range.

Optionally, the movable element is a rotatable member configured to receive an input for rotation angle change.

Optionally, the movable element is a slidable member configured to receive an input for linear displacement change.

Optionally, the electromagnetic induction potentiometer adaptive for full-stroke detection further includes a housing, and the rotatable member is rotatable with respect to the housing.

Optionally, the electromagnetic induction potentiometer adaptive for full-stroke detection further includes an output port, the magnetic induction sensor and the full-stroke adaptive output adjusting unit are accommodated in the housing, the output port is connected to the full-stroke adaptive output adjusting unit and accommodated in the housing, and the actual potential signal is output from the output port.

Optionally, the actual potential signal is an analog signal or a digital signal.

Advantageous effects of the present disclosure are as below.

A preset sampling range is defined by the full-stroke adaptive output adjusting unit, the actual potential output value is defined according to the comparison result of the initial potential sampling value and the actual potential sampling range, and the actual potential sampling range is adjusted according to the comparison result of the initial potential sampling value and the actual potential sampling range after the actual potential output value is obtained, dynamic adjustments to sampling ranges of the magnetic induction sensor can be achieved, the sampling ranges can be updated adaptively and dynamically when the initial potential sampling value is out of the preset potential sampling range, which ensures all values within the output range of the magnetic induction sensor can be collected, namely, the potentiometer can be detected at any position within a full-stroke range. Due to the steps of presetting sampling range, comparing references, outputting current values, and adaptively adjusting the sampling range, the preset sampling range can also be adaptively updated in real time even when a sampling value is out of a preset range, that is, output characteristics can be dynamically and adaptively corrected by the potentiometer based on actual usage to ensure detection of positions within the full-stroke range, which improves user experience without calibration of every potentiometer, thus improving production efficiency.

DETAILED DESCRIPTION OF PREFERRED EMBODIMENTS

In order to explain the technical solution of the present disclosure more clearly and completely, the present disclosure will be further described below in conjunction with the accompanying drawings.

First Embodiment

Figure 1:
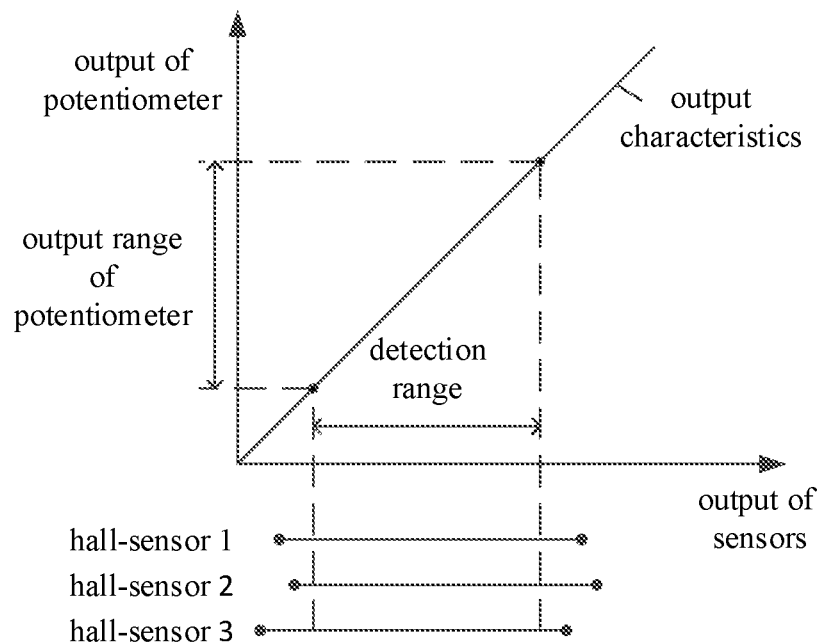
FIG. 1 is a schematic diagram showing the principle of adjustment to output ranges of electromagnetic induction potentiometers in prior art.
Figure 2:
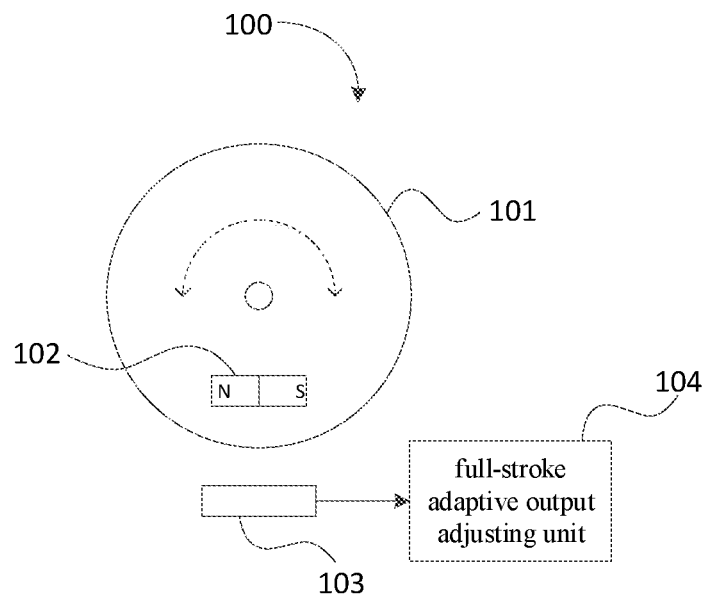
FIG. 2 is a structural schematic diagram of a first embodiment according to the present disclosure.

As shown in FIG. 1, an electromagnetic induction potentiometer adaptive for full-stroke detection 100 is provided by the present disclosure, which includes a rotatable member 101, a permanent magnet 102, a magnetic induction sensor 103, and a full-stroke adaptive output adjusting unit 104. The rotatable member 101 rotates around its center when subjected to an external force. The rotatable member 101 is configured to receive an external rotation input, and an output of the potentiometer can reflect position change induced by the external rotation input, which is a rotation angle change in this case. The permanent magnet 102 is attached to the rotatable member 101 and rotatable with the rotatable member 101. The magnetic induction sensor 103 is configured to sense positions of the permanent magnet 102 and generate an initial potential signal. The full-stroke adaptive output adjusting unit 104 is configured to collect the initial potential signal and adaptively adjust the initial potential signal to an actual potential signal corresponding to a full stroke of position change of the rotatable member 101.

The electromagnetic induction potentiometer adaptive for full-stroke detection 100 provided by the embodiment according to the present disclosure can overcome the shortcomings of conventional potentiometers such as short life and great interference caused by friction at contact points. Full-stroke position detection of the potentiometer can be fulfilled with the full-stroke adaptive output adjusting unit 104.

Furthermore, as a preferable embodiment, the full-stroke adaptive output adjusting unit 104 includes a signal output module, a signal output module, and a control module. The information collecting module is configured to collect the initial potential signal and obtain the initial potential sampling value. The signal output module is configured to output the actual potential signal.

The control module is configured to perform following steps.

B1: obtaining a preset potential sampling range, taking a minimum value of the preset potential sampling range as a minimum value of an actual potential sampling range, and a maximum value of the preset potential sampling range as a maximum value of the actual potential sampling range;

B2: controlling the information collecting module to sample output of the magnetic induction sensor and obtaining the initial potential sampling value;

B3: obtaining an actual potential output value according to a comparison result between the initial potential sampling value and the actual potential sampling range, and controlling the signal output module to output the actual potential signal;

B4: adjusting the actual potential sampling range according to the comparison result between the initial potential sampling value and the actual potential sampling range; and B5: returning to the step B2.

It should be noted that in this embodiment, the preset sampling range can be stored in a non-volatile storage device, that is, data survives in power failure. The preset sampling range is a relatively safe parameter range which is adaptive to inconsistencies in the output ranges of the magnetic induction sensors 103 due to individual differences. As an example, boundaries of the preset sampling range may be within boundaries of output values of a plurality of magnetic induction sensors 103.

A preset sampling range is defined by the full-stroke adaptive output adjusting unit 104, the actual potential output value is defined according to the comparison result of the initial potential sampling value and the actual potential sampling range, and the actual potential sampling range is adjusted according to the comparison result of the initial potential sampling value and the actual potential sampling range after the actual potential output value is obtained, dynamic adjustments to sampling ranges of the magnetic induction sensor 103 can be achieved, the sampling ranges can be updated adaptively and dynamically when the initial potential sampling value is out of the preset potential sampling range, which ensures all values within the output range of the magnetic induction sensor 103 can be collected, namely, the potentiometer can be detected at any position within a full-stroke range.

In an optional embodiment, the step B3 is defined as comparing the initial potential sampling value with the maximum value and the minimum value of the actual potential sampling range, taking the initial potential sampling value as an actual potential sampling value in response to that the initial potential sampling value is in the actual potential sampling range; taking the minimum value of the actual potential sampling range as the actual potential sampling value in response to that the initial potential sampling value is less than the minimum value of the actual potential sampling range; taking the maximum value of the actual potential sampling range as the actual potential sampling value in response to that the initial potential sampling value is greater than the maximum value of the actual potential sampling range; and defining the actual potential output value basing on the actual potential sampling value, the actual potential sampling range, and an actual potential output range and controlling the signal output module to output the actual potential signal according to the actual potential output value.

In an optional embodiment, a difference between the maximum value of the actual potential sampling range and the minimum value of the actual potential sampling range is taken as an amplitude of the actual potential sampling range, a difference between a maximum value of the actual potential output range and a minimum value of the actual potential output range is taken as an amplitude of the actual potential output range, and a ratio of the actual potential sampling value to the amplitude of the actual potential sampling range is equal to the a ratio of the actual potential output value to the amplitude of the actual potential output range. With the above constraint relationship, the actual potential output value can be calculated based on the actual potential sampling value, the actual potential sampling range, and the actual potential output range.

In an optional embodiment, the step B4 is defined as comparing the initial potential sampling value with the maximum value and the minimum value of the actual potential sampling range, omitting adjustment to the actual potential sampling range in response to that the initial potential sampling value is in the actual potential sampling range; updating the minimum value of the actual potential sampling range with the initial potential sampling value in response to that the initial potential sampling value is less than the minimum value of the actual potential sampling range; and updating the maximum value of the actual potential sampling range with the initial potential sampling value in response to that the initial potential sampling value is greater than the maximum value of the actual potential sampling range.

The following is an example to illustrate the effect of adjustment in this embodiment. Take sampling of a magnetic induction potentiometer applied to a joystick of a game controller as an example, the preset potential sampling range of the magnetic induction sensor is 0.7V-2.5V by default. When it is found that a range of the initial potential sampling value of the magnetic induction sensor changes to 0.5V-3V during usage, the actual potential sampling range is dynamically adjusted to 0.5V-3V until it is powered-off After it is powered-on again, the preset potential sampling range will return to the default range of 0.7V-2.5V; if the range of the initial potential sampling value of the magnetic induction sensor is 0.8V-2.4V, the default preset potential sampling range of 0.7V-2.5V is still used; if the range of the initial potential sampling value of the magnetic induction sensor is 0.8V-2.8V, the actual potential sampling range will be dynamically adjusted to 0.7-2.8V; and if the initial potential sampling value of the magnetic induction sensor is 0.5V-2.4V, the actual potential sampling range will be dynamically adjusted to 0.5V-2.5V.

Due to the steps of presetting sampling range, comparing references, outputting current values, and adaptively adjusting the sampling range, the preset sampling range can also be adaptively updated in real time even when a sampling value is out of a preset range, that is, output characteristics can be dynamically and adaptively corrected by the potentiometer based on actual usage to ensure detection of positions within the full-stroke range, which improves user experience without calibration of every potentiometer, thus improving production efficiency.

In an optional embodiment, the actual potential signal is an analog signal or a digital signal. The signal output module of the full-stroke adaptive output adjusting unit may adjust the actual potential signal to an analog signal or a digital signal and output the analog signal or the digital signal.

In an optional embodiment, the magnetic induction sensor 103 is a hall-sensor.

Second Embodiment

Figure 3:
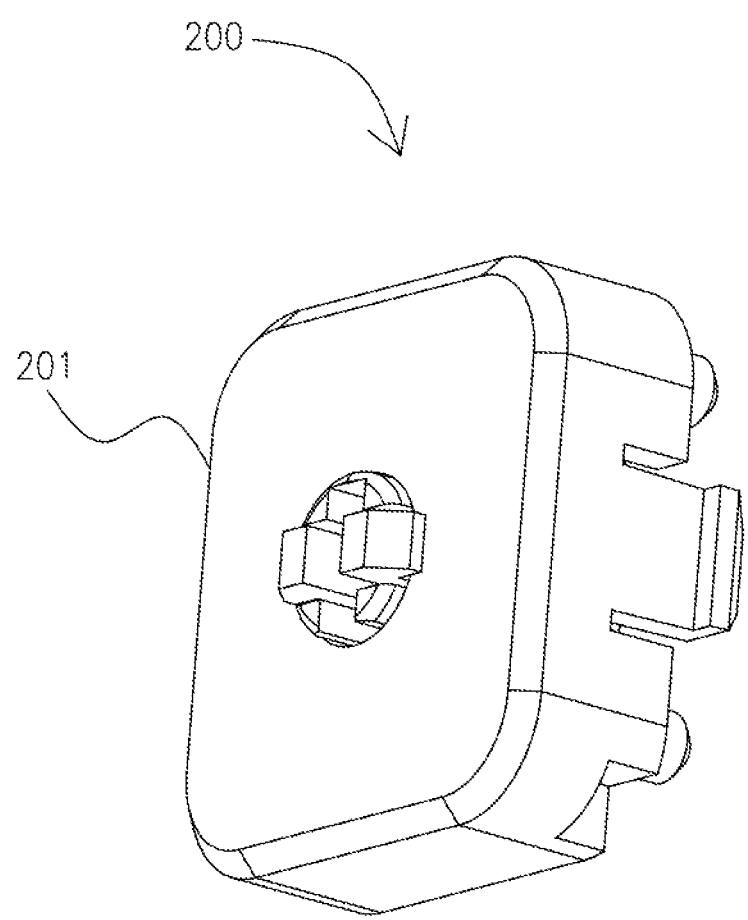
FIG. 3 is a structural schematic diagram of a second embodiment according to the present disclosure.
Figure 4:
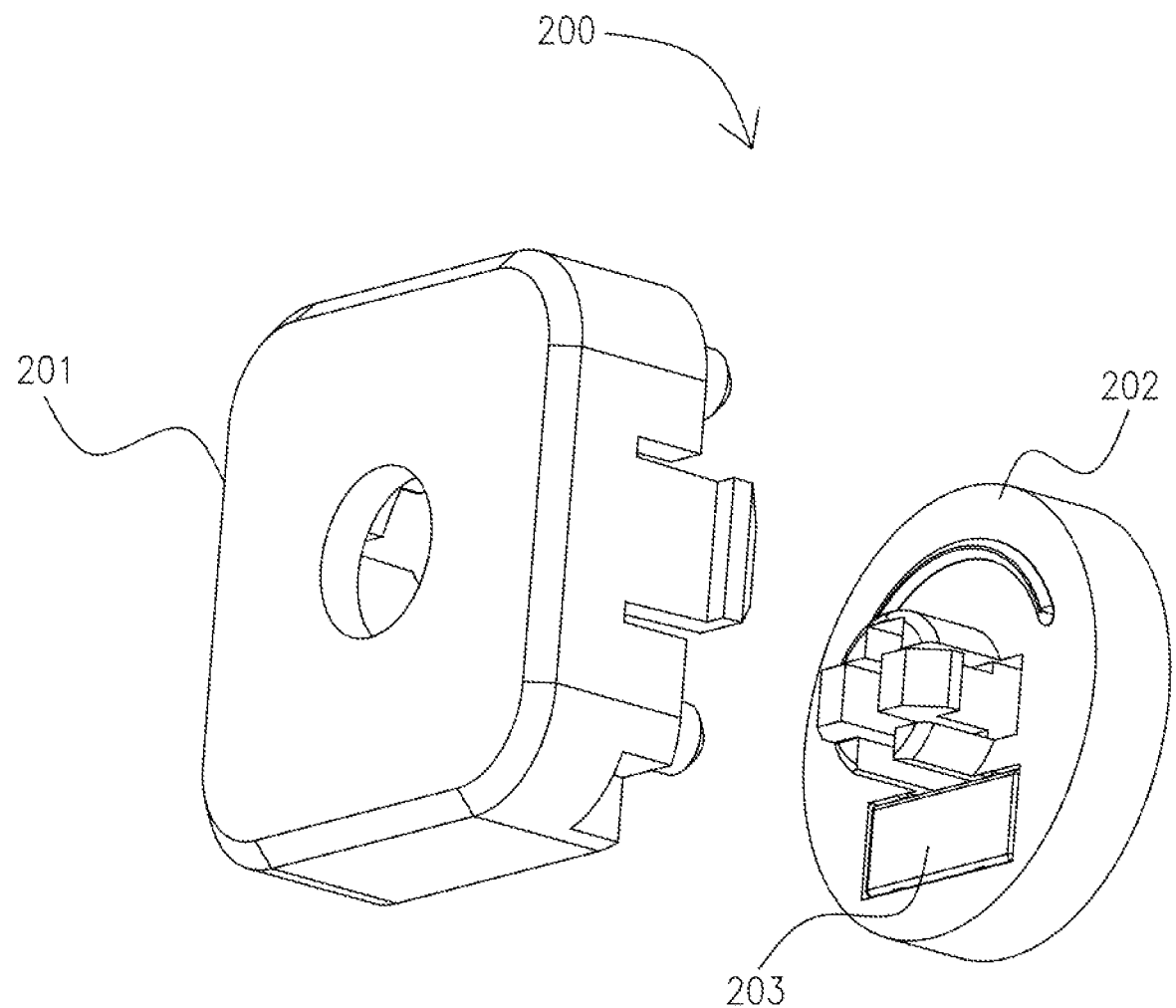
FIG. 4 is an exploded schematic diagram of the second embodiment according to the present disclosure.

As shown in FIGS. 3 and 4, an electromagnetic induction potentiometer adaptive 200 for full-stroke detection is provided by the present disclosure, which includes a housing 201, a rotatable member 202, a permanent magnet 203, a magnetic induction sensor, and a full-stroke adaptive output adjusting unit 204. The rotatable member 202 is rotatable relatively and clamped to the housing 201, and the permanent magnet 203 is accommodated in the rotatable member 202. The magnetic induction sensor and full-stroke adaptive output adjusting unit may be disposed in an external circuit outside the housing 201. The full-stroke adaptive output adjusting unit may be a unit computer, a microprocessor, or a DSP. The magnetic induction sensor is configured to sense positions of the permanent magnet 203 and generate an initial potential signal. The full-stroke adaptive output adjusting unit 204 is configured to collect the initial potential signal and adaptively adjust the initial potential signal to an actual potential signal corresponding to a full stroke of position change of the rotatable member 202.

In this embodiment, an internal arrangement of the full-stroke adaptive output adjusting unit is as same as the full-stroke adaptive output adjusting unit 104 in the first embodiment, therefore detailed description is omitted.

Third Embodiment

Figure 5:
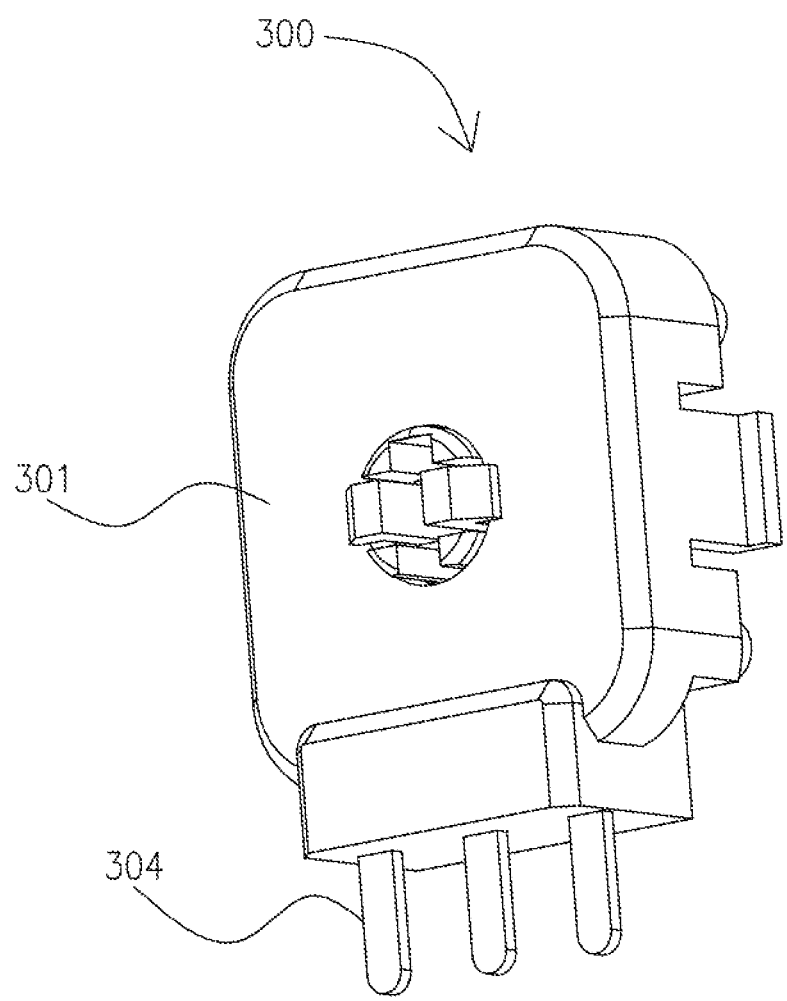
FIG. 5 is a structural schematic diagram of a third embodiment according to the present disclosure.
Figure 6:
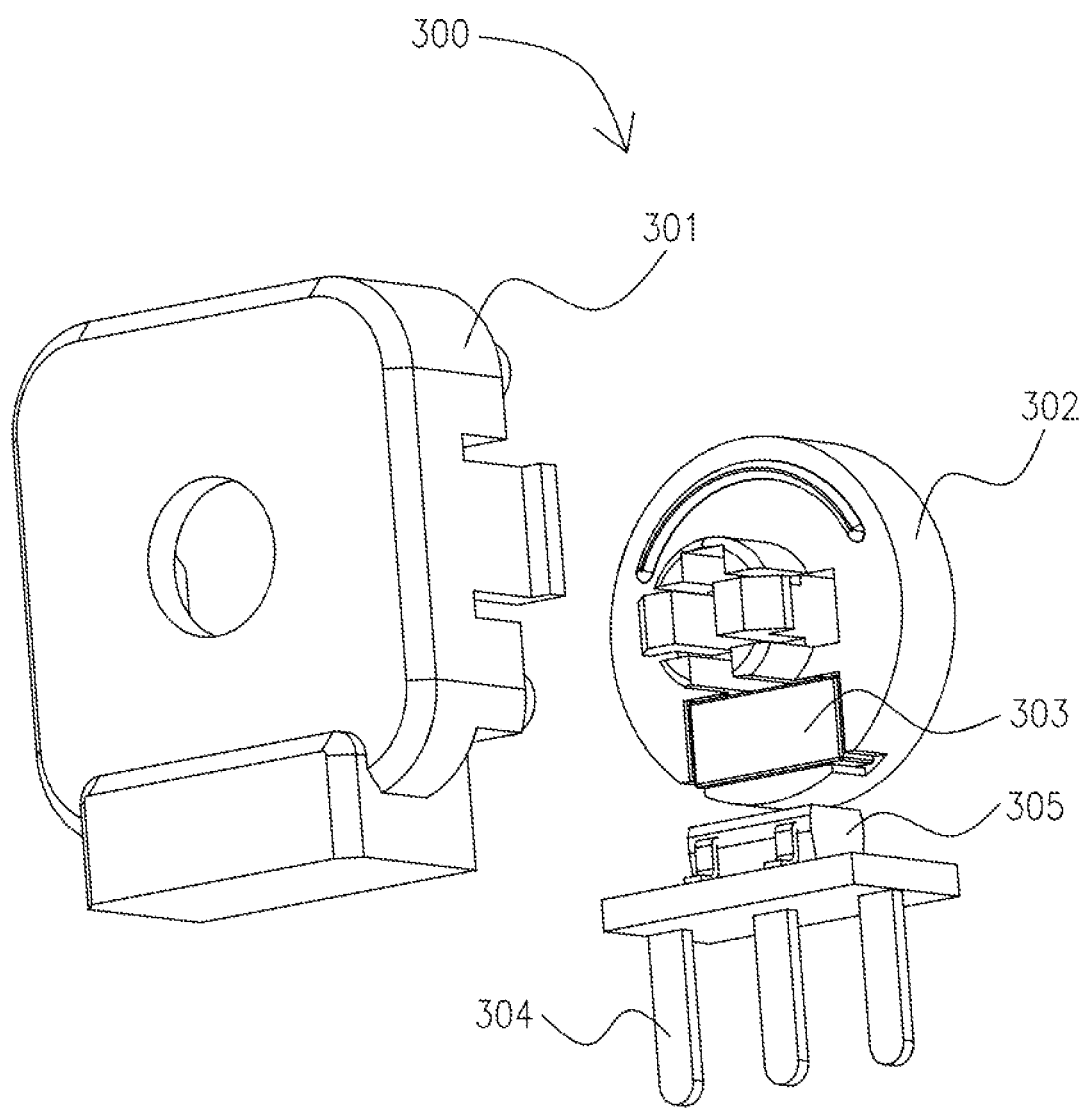
FIG. 6 is an exploded schematic diagram of the third embodiment according to the present disclosure.

As shown in FIGS. 5 and 6, an electromagnetic induction potentiometer adaptive 300 for full-stroke detection is provided by the present disclosure which includes a housing 301, a rotatable member 302, a permanent magnet 303, a magnetic induction sensor, a full-stroke adaptive output adjusting unit, and an output port 304. The rotatable member 302 is rotatable relatively and clamped to the housing 301, and the permanent magnet 303 is accommodated in the rotatable member 302. The magnetic induction sensor and the full-stroke adaptive output adjusting unit are both accommodated in the housing 301, and the output port 304 is connected to the full-stroke adaptive output adjusting unit and accommodated in the housing 301. The magnetic induction sensor is configured to sense positions of the permanent magnet 303 and generate an initial potential signal. The full-stroke adaptive output adjusting unit 304 is configured to collect the initial potential signal and adaptively adjust the initial potential signal to an actual potential signal corresponding to a full stroke of position change of the rotatable member 302, and the actual potential signal is output via the output port.

As a preferable embodiment, as shown in FIG. 6, the magnetic induction sensor and the full-stroke adaptive output adjusting unit are packaged as an integrated circuit chip 305.

In this embodiment, an internal arrangement of the full-stroke adaptive output adjusting unit is as same as the full-stroke adaptive output adjusting unit 104 in the first embodiment, therefore detailed description is omitted.

Fourth Embodiment

Figure 7:
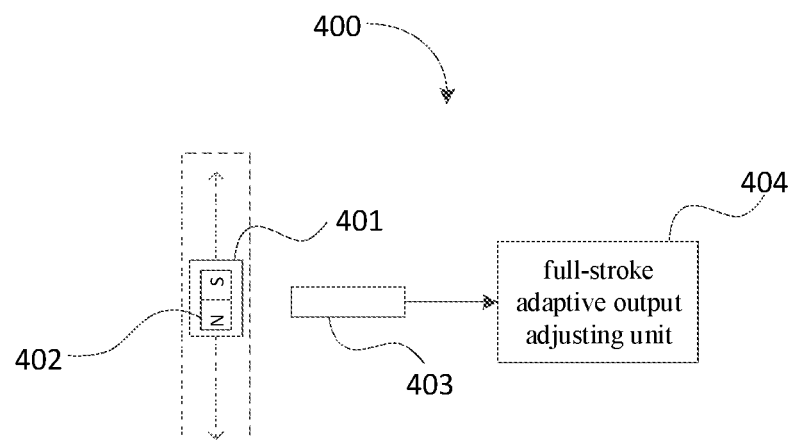
FIG. 7 is a structural schematic diagram of a fourth embodiment according to the present disclosure.

As shown in FIG. 7, an electromagnetic induction potentiometer adaptive for full-stroke detection 400 is provided by the present disclosure which includes a slidable member 401, a permanent magnet 402, a magnetic induction sensor 403, and a full-stroke adaptive output adjusting unit 404. The slidable member 401 slides in a straight line within a certain area when subjected to external force. The slidable member 401 receives an external input for position change, which is linear displacement change in this case, and the output of the potentiometer can reflect the change of linear displacement induced by the external input. The permanent magnet 402 is attached to the slidable member 401 and is slidable with the slidable member 401. The magnetic induction sensor 403 is configured to sense positions of the permanent magnet 402 and generate an initial potential signal. The full-stroke adaptive output adjusting unit 404 is configured to collect the initial potential signal and adaptively adjust the initial potential signal to an actual potential signal corresponding to a full stroke of position change of the slidable member.

In this embodiment, an internal arrangement of the full-stroke adaptive output adjusting unit 404 is as same as the full-stroke adaptive output adjusting unit 104 in the first embodiment, therefore detailed description is omitted.

Certainly, multiple other embodiments can be used to implement the present invention. Based on those embodiments, other embodiments obtained by persons of ordinary skill in the art without any creative work shall fall within the protection scope of the present disclosure.

What is claimed is:

1. An electromagnetic induction potentiometer comprising:
    a movable element configured to obtain an input for position change;
    a permanent magnet attached to the movable element;
    a magnetic induction sensor configured to sense positions of the permanent magnet and generate an initial potential signal; and
    a full-stroke adaptive output adjusting unit configured to collect the initial potential signal and adaptively adjust the initial potential signal to an actual potential signal corresponding to a full stroke of position change of the movable element;
    wherein the full-stroke adaptive output adjusting unit comprises:
    an information collecting module, configured to collect the initial potential signal and obtain the initial potential sampling value;
    a signal output module, configured to output the actual potential signal;
    a control module, configured to perform following steps:
    B1: obtaining a preset potential sampling range, taking a minimum value of the preset potential sampling range as a minimum value of an actual potential sampling range, and a maximum value of the preset potential sampling range as a maximum value of the actual potential sampling range;
    B2: controlling the information collecting module to sample output of the magnetic induction sensor and obtaining the initial potential sampling value;
    B3: obtaining an actual potential output value according to a comparison result between the initial potential sampling value and the actual potential sampling range, and controlling the signal output module to output the actual potential signal;
    B4: adjusting the actual potential sampling range according to the comparison result between the initial potential sampling value and the actual potential sampling range; and
    B5: returning to the step B2.

2. The electromagnetic induction potentiometer of claim 1, wherein the step B3 is defined as:
    comparing the initial potential sampling value with the maximum value and the minimum value of the actual potential sampling range, taking the initial potential sampling value as an actual potential sampling value in response to that the initial potential sampling value is in the actual potential sampling range; taking the minimum value of the actual potential sampling range as the actual potential sampling value in response to that the initial potential sampling value is less than the minimum value of the actual potential sampling range; taking the maximum value of the actual potential sampling range as the actual potential sampling value in response to that the initial potential sampling value is greater than the maximum value of the actual potential sampling range; and defining the actual potential output value basing on the actual potential sampling value, the actual potential sampling range, and an actual potential output range, and controlling the signal output module to output the actual potential signal according to the actual potential output value.

3. The electromagnetic induction potentiometer of claim 2, wherein a difference between the maximum value of the actual potential sampling range and the minimum value of the actual potential sampling range is taken as an amplitude of the actual potential sampling range, a difference between a maximum value of the actual potential output range and a minimum value of the actual potential output range is taken as an amplitude of the actual potential output range, and a ratio of the actual potential sampling value to the amplitude of the actual potential sampling range is equal to the a ratio of the actual potential output value to the amplitude of the actual potential output range.

4. The electromagnetic induction potentiometer of claim 1, wherein the step B4 is defined as:

comparing the initial potential sampling value with the maximum value and the minimum value of the actual potential sampling range, omitting adjustment to the actual potential sampling range in response to that the initial potential sampling value is in the actual potential sampling range; updating the minimum value of the actual potential sampling range with the initial potential sampling value in response to that the initial potential sampling value is less than the minimum value of the actual potential sampling range; and updating the maximum value of the actual potential sampling range with the initial potential sampling value in response to that the initial potential sampling value is greater than the maximum value of the actual potential sampling range.

5. The electromagnetic induction potentiometer of claim 1, wherein the movable element is a rotatable member configured to receive an input for rotation angle change.

6. The electromagnetic induction potentiometer of claim 1, wherein the movable element is a slidable member configured to receive an input for linear displacement change.

7. The electromagnetic induction potentiometer of claim 5, further comprising a housing, and the rotatable member being rotatable with respect to the housing.

8. The electromagnetic induction potentiometer of claim 7, further comprising an output port, wherein the magnetic induction sensor and the full-stroke adaptive output adjusting unit are accommodated in the housing, the output port is connected to the full-stroke adaptive output adjusting unit and accommodated in the housing, and the actual potential signal is output from the output port.

9. The electromagnetic induction potentiometer of claim 1, wherein the actual potential signal is an analog signal or a digital signal.

* * * * *